Patented Mar. 3, 1925.

1,528,619

UNITED STATES PATENT OFFICE.

ALPHONSE KOENIG, OF STRASBOURG, FRANCE, ASSIGNOR TO PAUL HOFER AND PAUL PHILIPPI, OF BASEL, SWITZERLAND.

PRODUCTION OF COLD GLAZE WALL AND FLOOR PLATES.

No Drawing.   Application filed September 22, 1924. Serial No. 739,207.

*To all whom it may concern:*

Be it known that I, ALPHONSE KOENIG, a citizen of the French Republic, and resident of Strasbourg (Bas-Rhin), France, have invented new and useful Improvements in the Production of Cold Glaze Wall and Floor Plates, of which the following is a full, clear, and exact specification.

This invention relates to improvements in the production of cold glaze wall and floor plates. The plates consist of two different layers, namely the actual plate or pottery layer and a glaze layer. For the production of the pottery layer white sand, terrazo, magnesite, magnesium chloride and alum are used, terrazo being a ground mass of marble or the like; the glaze layer is composed of borax, casein, magnesium sulfate or Epsom salt, magnesite together with the desired mineral color.

Mixtures which give practical results free from objection are as follows:—

(a) For the plate or pottery layer 10 kg. of white dry sand, 2.5 kg. of white terrazo, 4 kg. of white finely ground magnesite of 78–80% content, 3.6 L of a magnesium chloride solution of 25° Bé, 0.25 L of an alum solution of 6° Bé, and 0.75 L of water.

(b) For the glaze layer 20 g. of borax, 2 teaspoonfuls casein, 250–300 g. of white finely ground 78–90% magnesite, 150–250 g. of a coloring matter according to the desired shade and ⅜ L of a magnesium sulfate or Epsom salt solution of 22° Bé.

For the production of the plate or pottery layer the sand, terrazo and magnesite are weighed out and intimately mixed with one another, then the magnesium chloride solution and thereupon the alum solution are added to the mass while constantly stirring, and the resulting pulp is well stirred and reduced to a thin fluid by the addition of water. For the preparation of the glaze layer, the borax is heated to boiling point in about ¼ L of water and after cooling the given quantity of casein is added to the solution. Then a pulp of magnesite, coloring matter and magnesium sulfate or Epsom salt solution of 22° Bé. is made to which are added, while continuously stirring, about 20 drops of the previously prepared borax-casein solution and finally as much again Epsom salt solution is added, so that a pulpy mass is produced. A suitable thickness of this pulpy mass is spread on a smooth glass plate, which is then laid into a mould with the glaze layer at the top, and the mould is then filled with the pottery mixture for forming the plate body while this mixture is still soft and plastic. The whole is left for some time to set, the glass plate and the mould are removed after drying and hardening and the upper surface of the glaze layer is eventually coated with a transparent lacquer varnish. As coloring matter lithopone is preferably used for white plates, zinc green for green plates, and for plates of other colors the usual mineral colors such as cement yellow, cement red, cement manganese black etc. are employed.

Firing of the finished plates is not necessary, as they are completely finished after drying without further operations. They are entirely acid proof and have the same resistance to mechanical action as fired plates. The glaze does not split or crack; the plates can be made of small thickness and their homogeneous structure allows of easy trimming with stoneworking tools.

What I claim is:—

1. A process for the production of cold glaze wall and floor plates in which a pulpy glaze mixture is formed of watery borax solution, casein, white finely ground magnesite, mineral coloring matter and Epsom salt solution, then spread on a glass plate arranged in a mould and while still soft and plastic is spread over with a mixture of white dry sand, white terrazo, white finely ground magnesite, magnesium chloride solution, alum solution and water, the glass plate and the mould being removed after hardening.

2. A wall of floor plate composed of two interconnected layers, one of them being formed of a watery borax solution, casein, white finely ground magnesite, mineral coloring matter and Epsom salt solution, the other being formed of dry sand, white terrazo, white finely ground magnesite, magnesium chloride solution, alum solution and water, and obtained with the aid of a glass plate and a mould according to the process above referred to.

In witness whereof I have hereunto signed my name this 9th day of September, 1924, in the presence of two subscribing witnesses.

ALPHONSE KOENIG.

Witnesses:
CHESTER W. DAVIS,
MARTHE STEINEBRUN.